United States Patent [19]

Nishimura et al.

[11] Patent Number: 5,186,434
[45] Date of Patent: Feb. 16, 1993

[54] FLUID FLOW CONTROLLER

[75] Inventors: Ryutaro Nishimura; Michio Yamaji; Hirokatsu Maeda; Nobukazu Ikeda; Kenji Yamamoto, all of Osaka, Japan

[73] Assignee: Masako Kiyohara, Kumamoto, Japan

[21] Appl. No.: 865,241

[22] Filed: Apr. 8, 1992

[30] Foreign Application Priority Data

May 9, 1991 [JP] Japan ................... 3-133450

[51] Int. Cl.⁵ ............................................. F16K 7/17
[52] U.S. Cl. ............................. 251/331; 251/62; 251/368
[58] Field of Search ................... 251/331, 368, 62

[56] References Cited

U.S. PATENT DOCUMENTS 4,867,201 9/1989 Carten .................... 251/331 X
4,915,353 4/1990 Danko .................... 251/331

FOREIGN PATENT DOCUMENTS 61-119675 7/1986 Japan.
63-72984 4/1988 Japan.

Primary Examiner—Arnold Rosenthal
Attorney, Agent, or Firm—Griffin Butler Whisenhunt & Kurtossy

[57] ABSTRACT

A fluid flow controller comprising a flow passage which is opened and closed by the flexing of a diaphragm secured at its periphery characterized in that the diaphragm is a laminate of a plurality of metal diaphragms and in that friction reducing material is provided between the diaphragms.

12 Claims, 1 Drawing Sheet

FLUID FLOW CONTROLLER

The present invention relates to a fluid flow controller used in fluid duct of, for example chemical apparatus or mechanical apparatus, and in particular to an improvement in the fluid flow controller which uses the resilient flexing of a metal diaphragm to open and close the flow passage.

A fluid flow controller of this type is hitherto known as disclosed, for example, in the Japanese Laid-open Patent Sho. 63-72984. This controller is basically composed of a support member for the diaphragm, a clamping member disposed so as to be capable of bearing against the fixing member, and a laminate consisting of a plurality of metal diaphragms with the peripheral edges clamped between the support member and clamping member.

The metal laminate is repeatedly deformed for the purpose of fluid flow control.

We have found that such a laminate had a short working life and have appreciated that this is due to sliding wear between the diaphragms in the laminate.

According to the present invention there is provided a fluid flow controller comprising a flow passage which is opened and closed by the flexing of a diaphragm secured at its periphery characterised in that the diaphragm is a laminate of a plurality of metal diaphragms and in that friction reducing material is provided between the diaphragms.

When the laminate is deformed, the adjacent diaphragms slide on each other, but since a sliding and smoothing anti-friction material is placed between them wear and consequent damage is reduced.

The invention will now be described by way of example and with reference to the drawings wherein.

Figure 1:
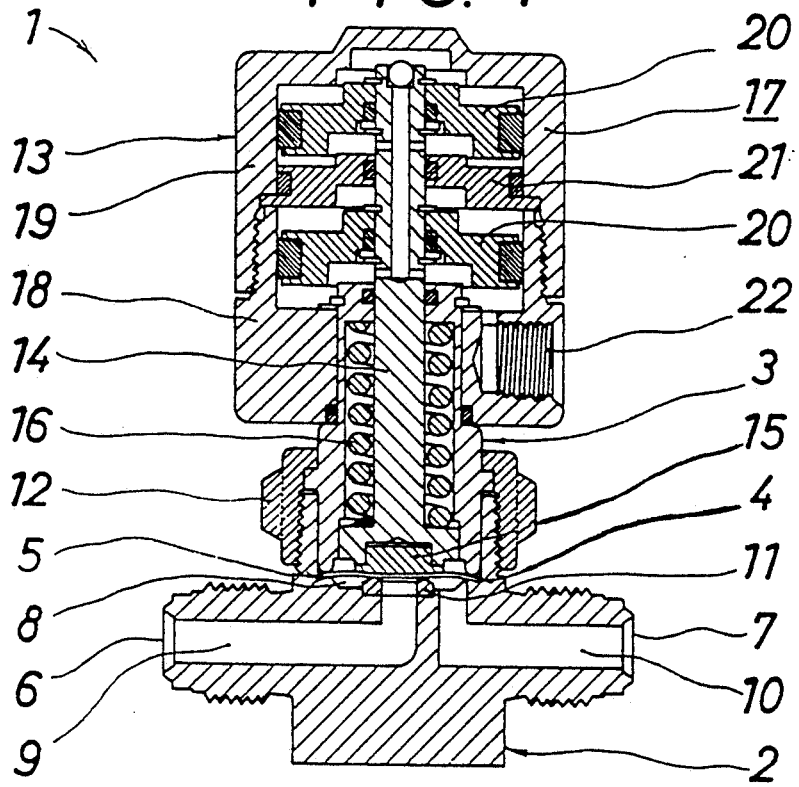
FIG. 1 is a longitudinal sectional view showing a fluid flow controller in a first embodiment of the invention.

A fluid flow controller 1 comprises a base body 2 with an inlet 6 at the left side, an outlet 7 at the right side, and a stepped concave chamber 8 opening upward. The inlet 6 and the middle part of the bottom of the concave chamber 8 communicate with each other through a flow-in passage 9, and the right side of the bottom of the concave chamber 8 and the outlet 7 through a flow-out passage 10. An upwardly facing annular seat 11 is disposed at a part of the flow-in passage 9 opposite to the concave chamber 8, that is, in the middle part of the bottom of the concave chamber 8.

A valve cover or bonnet 3 is arranged to be in clamping relationship with body 2.

Thus the cover 3 is fitted into the enlarged part of the concave chamber 8, and is fixed to the upper part of the body 2 by a nut 12 screwed into the upper part of the body 2.

A plurality of metal diaphragms 4 are arranged as a laminate with the peripheral edges held and fixed, i.e. clamped between the member 2 and cover 3. In this embodiment, being of direct type contacting directly with the seat 11, three or four nickel alloy discs of about 0.1 to 0.2 mm in thickness and about 25 to 30 mmφ in outside diameter are used.

The metal diaphragms 4 are put into the enlarged part of the concave chamber 8, and their outer circumferenci are clamped in airtight manner by the cover 3. The laminates are operated, i.e. flexed by an actuating mechanism 13.

The actuating mechanism 13 in this embodiment is of reverse action pneumatic type and comprises a stem 14 elevatably disposed on the cover 3, a diaphragm holder 15 being located in the lower part thereof to abut against the metal diaphragms 4, a spring 16 urging the stem 14 downwardly being placed between the cover 3 and stem 14, and a pneumatic actuator 17 for lifting the stem 14 by pneumatic pressure such as air pressure against the bias of spring 16 being mounted on the upper part of the cover 3. The pneumatic actuator 17 is composed of an actuating body 18, an actuator cap 19, a piston 20, a counterplate 21 and a gas intake/exhaust port 22.

The sliding smoothing non-friction material 5 is disposed between metal diaphragms 4 and is designed to smooth their sliding, and in this embodiment it is a lubricating oil 23 such as grease placed between metal diaphragms 4, and it is applied to the contacting surfaces of metal diaphragms 4.

The operation is described below.

Figure 2:
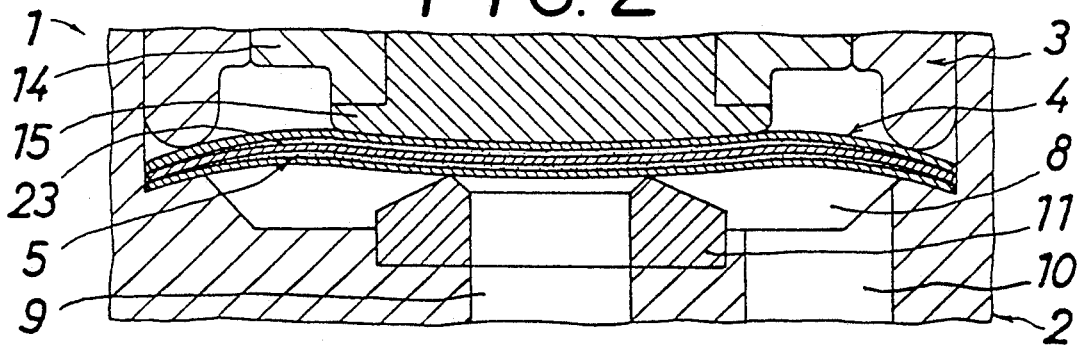
FIG. 2 is a magnified longitudinal sectional view of essential parts of FIG. 1.

FIGS. 1 and 2 show the closed state, in which fluid flow from the inlet 6 is arrested at the position of the seat. In this state the elastic force of the spring 16 presses stem 14 and the diaphragm holder 15 downward, and the middle part of the metal diaphragm 4 is deformed downwardly to be seated on the seat 11.

When a pressure gas is supplied into the pneumatic actuator 17, the stem 14 and diaphragm holder 15 are moved upward against the elastic force of the spring 16, and the metal diaphragms 4 are deformed upward by their own elastic recovery and the fluid from the inlet 6 and are separated from the seat 11.

Therefore, the fluid from the inlet 6 flows in the route of flow-in passage 9, concave chamber 8, flow-out passage 10, and outlet 7, which is the open state. When supply of pressure gas to the pneumatic actuator 17 is stopped spring 16 closes the valve as set out above.

Since the metal diaphragms 4 have their peripheral edges held and fixed in airtight state between the body 2 and cover 3, the fluid reaching the concave chamber 8 will not leak outside.

For the purpose of fluid control, as the metal diaphragms 4 are repeatedly deformed, the adjacent ones will slide on each other, but since the lubricating oil 23 is placed between them, they slide smoothly.

Accordingly, wear, seizure or early breakage due to contact friction of the adjacent diaphragms 4 may be avoided. As a result of experiment, the life could be extended 1.5 to 2 times longer.

Figure 3:
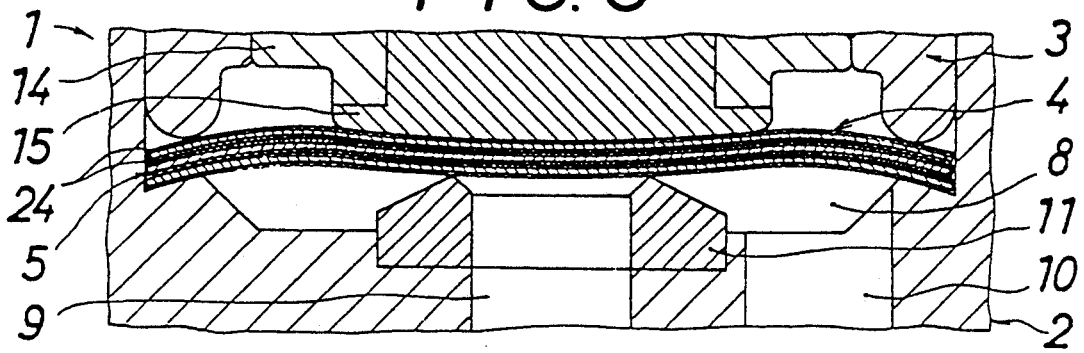
FIG. 3 is a magnified longitudinal sectional view of a second embodiment of the invention.

A second embodiment of the invention is described by reference to FIG. 3.

The second embodiment is different from the first embodiment in that the friction reducing sliding smoothing material 5 is a plating layer 24 such as silver plating disposed on each metal diaphragm 3.

In the second embodiment, the plating layer 24 is applied on both face and reverse sides of each metal diaphragm 3.

The fixing member 2 and tightening member 3 were body and cover in the preceding embodiment, but these are not limitative, and for example they may be actuator body and actuator cap as disclosed in the Japanese Laid-open Utility Model Sho. 61-119675.

The metal diaphragms 3 were of direct type directing contacting with the seat in the foregoing embodiment, but this is not limitative and for example they may be of indirect type having a disc to be seated on the seat as disclosed in the Japanese Laid-open Patent Sho. 63-72984.

The sliding smoothing material 5 is not limited to the lubricating oil 23 or plating layer 24 employed in the above embodiments.

The actuating mechanism 13 was of pneumatic operating type in the embodiments, but may be also of other operating type or manual type.

The actuating mechanism 13 was of reverse action type in the preceding embodiments, but it is not limitative and it may be of, for example, normal action type.

As described herein, according to the invention, the following excellent effects are brought about.

(1) Being composed of fixing member, tightening member, metal diaphragms and sliding smoothing material, especially by using the sliding smoothing material, the metal diaphragms are not broken early if deformed repeatedly, and the life may be notably extended.

(2) Only by providing with the sliding smoothing material, the cost is not increased so much, and it may be easily applied to the existing structure.

(3) By using lubricating oil or plating layer as the sliding smoothing material, it also contributes to prevention of rusting of the metal diaphragms.

We claim:

1. A fluid flow controller comprising a flow passage which is opened and closed by the flexing of a diaphragm secured at its periphery characterised in that the diaphragm is a laminate of a plurality of metal diaphragms and in that friction reducing material is provided between the diaphragms.

2. A fluid flow controller according to claim 1, wherein the friction reducing material is lubricating oil placed between the metal diaphragms.

3. A fluid flow controller of claim 1, wherein the friction reducing material is a plating layer disposed on the metal diaphragms.

4. A fluid flow controller according to claim 1 wherein the laminate member is clamped between the body of a valve surrounding a fluid flow passage and the valve cover.

5. A fluid flow controller according to claim 2 wherein the laminate member is clamped between the body of a valve surrounding a fluid flow passage and the valve cover.

6. A fluid flow controller according to claim 3 wherein the laminate member is clamped between the body of a valve surrounding a fluid flow passage and the valve cover.

7. A fluid flow controller as claimed in claim 1 wherein a pressure fluid actuator operates to relieve a spring biased closure of the diaphragm.

8. A fluid flow controller as claimed in claim 2 wherein a pressure fluid actuator operates to relieve a spring biased closure of the diaphragm.

9. A fluid flow controller as claimed in claim 3 wherein a pressure fluid actuator operates to relieve a spring biased closure of the diaphragm.

10. A fluid flow controller as claimed in claim 4 wherein a pressure fluid actuator operates to relieve a spring biased closure of the diaphragm.

11. A fluid flow controller as claimed in claim 5 wherein a pressure fluid actuator operates to relieve a spring biased closure of the diaphragm.

12. A fluid flow controller as claimed in claim 6 wherein a pressure fluid actuator operates to relieve a spring biased closure of the diaphragm.

* * * * *